US012260531B2

(12) United States Patent
Roulet et al.

(10) Patent No.: US 12,260,531 B2
(45) Date of Patent: Mar. 25, 2025

(54) USING IMAGER WITH ON-PURPOSE CONTROLLED DISTORTION FOR INFERENCE OR TRAINING OF AN ARTIFICIAL INTELLIGENCE NEURAL NETWORK

(71) Applicant: ImmerVision, Inc., Montreal (CA)

(72) Inventors: Patrice Roulet, Montreal (CA); Pierre Konen, Saint-Bruno (CA); Pascale Nini, Orford (CA); Simon Thibault, Quebec City (CA); Jocelyn Parent, Montreal (CA); Viacheslav Natashyn, Chateauguay (CA); Julie Buquet, Montreal (CA)

(73) Assignee: IMMERVISION, INC., Montreal (CA)

( * ) Notice: Subject to any disclaimer, the term of this patent is extended or adjusted under 35 U.S.C. 154(b) by 137 days.

(21) Appl. No.: 16/950,218

(22) Filed: Nov. 17, 2020

(65) Prior Publication Data
US 2021/0150679 A1 May 20, 2021

Related U.S. Application Data

(60) Provisional application No. 62/936,647, filed on Nov. 18, 2019.

(51) Int. Cl.
*G06T 5/80* (2024.01)
*G06N 3/084* (2023.01)
(Continued)

(52) U.S. Cl.
CPC ............... *G06T 5/80* (2024.01); *G06N 3/084* (2013.01); *G06N 3/086* (2013.01); *G06T 3/00* (2013.01);
(Continued)

(58) Field of Classification Search
CPC . G06T 5/006; G06T 3/00; G06T 2207/20081; G06T 2207/20084;
(Continued)

(56) References Cited

U.S. PATENT DOCUMENTS 6,844,990 B2 1/2005 Artonne et al.
6,865,028 B2 3/2005 Moustier et al.
(Continued)

FOREIGN PATENT DOCUMENTS

JP 2019117577 A 7/2019

OTHER PUBLICATIONS

Int'l Search Report and Written Opinion issued on Feb. 9, 2021 in Int'l Application No. PCT/IB2020/060824.
(Continued)

*Primary Examiner* — Jianxun Yang
(74) *Attorney, Agent, or Firm* — Panitch Schwarze Belisario & Nadel LLP

(57) ABSTRACT

A method for training and using a convolutional neural network with images having on-purpose distortion is disclosed. By distorting on-purpose the image to create zone of interest with higher number of pixels, the resulting output from the neural network is improved. The distorted images are created using an imager device either comprising an optical system specifically designed to output distorted images or comprising software or hardware image distortion manipulation algorithm to create the distorted images from normal images. Also described is a method for training the neural network using a distorted image generator from various existing datasets.

15 Claims, 8 Drawing Sheets

(51) Int. Cl.
   *G06N 3/086*   (2023.01)
   *G06T 3/00*    (2024.01)
(52) U.S. Cl.
   CPC .............. *G06T 2207/20081* (2013.01); *G06T 2207/20084* (2013.01)
(58) Field of Classification Search
   CPC ...... G06N 3/084; G06N 3/086; G06N 3/0481; G06N 3/0454; G06N 3/0472
   See application file for complete search history.

(56)  References Cited

U.S. PATENT DOCUMENTS

| | | | |
|---|---|---|---|
| 9,715,642 B2 | 7/2017 | Szegedy et al. | |
| 9,754,351 B2 | 9/2017 | Paluri et al. | |
| 9,829,700 B2 | 11/2017 | Parent et al. | |
| 10,204,398 B2 | 2/2019 | Roulet et al. | |
| 10,268,947 B2 | 4/2019 | Wang et al. | |
| 10,353,271 B2 | 7/2019 | Wang et al. | |
| 10,360,494 B2 | 7/2019 | Wang et al. | |
| 10,599,952 B1* | 3/2020 | Farivar | G06N 3/0454 |
| 2017/0039456 A1* | 2/2017 | Saberian | G06N 3/045 |
| 2018/0032844 A1 | 2/2018 | Yao et al. | |
| 2018/0150684 A1 | 5/2018 | Wang et al. | |
| 2018/0249148 A1* | 8/2018 | Roulet | H04N 13/239 |

OTHER PUBLICATIONS

Int'l Preliminary Report on Patentability issued Jun. 2, 2022 in Int'l Application No. PCT/IB2020/060824.

Qian et al., "Oriented Spatial Transformer Network for Pedestrian Detection Using Fish-Eye Camer," IEEE Transactions on Multimedia, vol. 22, No. 2, (Feb. 2020).

Deng et al., "CNN based Semantic Segmentation for Urban Traffic Scenes using Fisheye Camera," IEEE Intelligent Vehicles Symposium (IV), (Jun. 11-14, 2017).

Suematsu et al., "A Wide Angle Vision Sensor with Fovea-Design of Distortion Lens," vol. 31, No. 10, pp. 1556-1563 (1995).

Yamanaka et al., "Accuracy Improvement of Monocular Depth Estimation by Super-Resolution Network Using VDSR," The 25th Image Sensing Symposium (SSII2019), Jun. 2019 (with Partial English Summary).

Office Action issued May 24, 2023 in JP Application No. 2022-528630 (with Partial English Summary).

Tomonori Shindoh, Google Innovates with Deep Learning-Based Monocular SLAM Technology—Realization of Self-Localization System That Surpasses Existing vSLAM, Nikkei Robotics vol. 48, Nikkei Business Publications, Inc., Jul. 2019.

English translation of Decision of Refusal issued Sep. 13, 2023 in JP Patent Application No. 2022-528630.

* cited by examiner

USING IMAGER WITH ON-PURPOSE CONTROLLED DISTORTION FOR INFERENCE OR TRAINING OF AN ARTIFICIAL INTELLIGENCE NEURAL NETWORK

CROSS-REFERENCE TO RELATED APPLICATIONS

The present application claims the benefit of U.S. Provisional Patent Application No. 62/936,647, filed on Nov. 18th, 2019, entitled "Using imager with on-purpose controlled distortion for inference or training of an artificial intelligence neural network," currently pending, the entire contents of which are incorporated by reference herein.

BACKGROUND OF THE INVENTION

Embodiments of the present invention relate to the field of artificial intelligence convolutional neural networks and their use and more particularly to how to properly use these neural networks using imager with controlled distortion.

Using artificial intelligence to process or analyze digital image files is increasingly popular thanks to the increasingly available processing power in personal computers, mobile devices or in larger server farms from large companies. The rise of artificial intelligence usage is also explained by the new capabilities possible thanks to them for a wide range of applications.

When analyzing digital image files, the most common type of neural network used is a convolutional neural network, meaning that some convolution operations are done in some layers of the network. The idea of using neural networks (NN) to process digital image files for general applications has already been presented in the past, including the use of convolutional neural network (CNN) as in U.S. Pat. Nos. 9,715,642, 9,754,351, or 10,360,494. Using convolutional neural networks for some specific applications have also been widely presented in the past, including object recognition as in U.S. Patent Application Publication No. 2018/0032844, face recognition as in U.S. Pat. No. 10,268,947, depth estimation as in U.S. Pat. No. 10,353,271, age and gender estimation as in U.S. Patent Application Publication No. 2018/0150684, or the like.

However, existing convolutional neural networks processing images are greatly limited in input image resolution, especially for applications that require global image analysis that cannot be applied sequentially on smaller sub parts of the image like depth estimation from single image. Using modern computers with GPU having $\approx$10 gigabytes of RAM memory, these neural networks are currently limited to analyzing and processing images of about 512×512 resolution, which is $\approx$0.25 MPx, largely inferior to the $\approx$20-50 MPx images available in modern mobile devices or cameras. The consequence of this limit of resolution of digital image files that can be efficiently processed for some applications is a poorer processing or analysis from the neural networks compared to what would be possible using the full resolution of the input image. This limitation is even more critical in applications with embedded systems in which the processing power is highly limited.

One way to increase the number of pixels on objects of interest without having to increase the total number of pixels in the image is to use on-purpose controlled distortion. The idea to modify on-purpose the image resolution, either at the optical system, the hardware or software level has been presented in the past, as in U.S. Pat. Nos. 6,844,990, 6,865,028, 9,829,700, or 10,204,398. However, the resulting distorted images from these imagers are not well analyzed or processed in existing convolutional neural network and new types of networks or training methods are required to use images with on-purpose controlled distortion. Another way to have high resolution input in a neural network is to crop a sub-region of the full image and only analyze this sub region inside the neural network. However, cropping a sub region or a region of interest of the full image loses the full scene information and continuity, which is important in some applications for which the neural network needs global information from the full scene in order to provide the best output.

One kind of digital image file that often has controlled distortion is a wide-angle image, with total field of view generally larger than $\approx$80°. However, such wide-angle images with their associated ground truth data are rare compared to narrow angle images without controlled distortion. Most existing large image datasets used to train existing neural networks are based on narrow-angle images without distortion and a new training method is required to train neural networks with wide-angle images or with narrow-angle images with on-purpose controlled distortion.

BRIEF SUMMARY OF THE INVENTION

To overcome all the previously mentioned issues, embodiments of the present invention present a method to train and use a convolutional neural network with images having on-purpose targeted distortion.

In a preferred embodiment according to the present invention, the method starts with an imager creating a digital image file having controlled distortion. This imager can be any device creating a distorted image, including virtual image generator, image distortion transformation software or hardware or devices with an optical system capturing directly images with controlled distortion using an image sensor in the focal plane of the optical system. This imager can output images with either a unique static distortion profile or a dynamic distortion profile that can change in time. With the preferred embodiment, the image with controlled distortion outputted from the imager has at least one zone of interest wherein the resolution, calculated in pixels per degree of the object field of view, is at least 10% higher than compared to a normal digital image file without controlled distortion. This image with controlled distortion is then inputted in a neural network of any kind. The neural network often comprises at least one layer of convolution operations, but it is not always required according to the present invention. This neural network can run on any physical device capable of executing algorithms. When the neural network has been specifically trained with images having controlled distortion, it can process the input distorted image. The result from inputting this distorted image in the neural network specifically trained with distorted images is a more precise resulting output interpreted data in that zone of interest where the number of pixels was increased, which can then also help getting improved results in the other part of the image outside of the zone of interest. This improved result for the interpreted data can be anything, depending on the application of the neural network, including image depth information, object recognition, object classification, object segmentation, estimation of optical flow, connecting edges and lines, simultaneous localization and mapping (SLAM), super-resolution images creation or the like. In some embodiments of the present invention, the output interpreted data from the neural network could still be an image with controlled distortion. In that case, depending on if the image is to be used by a human observer or not, an optional image distortion correction and dewarping step is possible to get a final output image without distortion. This optional step is often not required if the output from the neural network is to be used directly by another algorithm unit, computer or any other automated process.

In order to use a convolutional neural network with input digital image files having on-purpose controlled distortion, the neural network must be trained specifically for these. The method according to the present invention includes a distorted image dataset generator from existing large image datasets without controlled distortion. Since the existing image datasets comprise various kind of objects captured with normal lenses without on-purpose distortion, they cannot be used directly to train our proposed network. The distorted image dataset generator processes the original images from existing datasets to add any kind of on-purpose distortion, including radially symmetrical distortion, free-form distortion centered or not on a specific object or stretched distortion in the corner of images. The resulting distorted images dataset can then optionally be expanded by using data enhancement techniques or operations like rotation, translation, scaling, homothety and mirroring to increase the number of situations that the neural network is trained with. The dataset can also be expanded by using projection techniques as planispheric, rectilinear, perspective tilt correction, or any kind of projections. The new datasets generated with images with controlled distortion are then used to train the neural network to learn to use these images with controlled distortion via any kind of supervised or unsupervised learning technique.

In some alternate embodiments according to the present invention, the original images from the imager, with or without distortion, are first converted to a well-defined standardized view with an on-purpose controlled distortion that is standardized in order to use a neural network that is trained specifically with this standardized distortion profile, allowing to avoid long retraining of the neural networks for each new distortion profile. This standardized view could have or not some zones of missing texture information depending on how the original image is captured and the requirements of the standardized view.

In some alternate embodiments according to the present invention, the original images from the imager are first processed to remove or minimize the image distortion in order to use the processed image with existing neural network already trained to be used with image without controlled distortion, allowing to avoid training a new neural network for the specific distortion profile resulting from the imager.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustration, there is shown in the drawings an embodiment which is presently preferred. It should be understood, however, that the invention is not limited to the precise arrangements and instrumentalities shown.

In the drawings.

DETAILED DESCRIPTION OF THE INVENTION

The words "a" and "an", as used in the claims and in the corresponding portions of the specification, mean "at least one."

Figure 1:
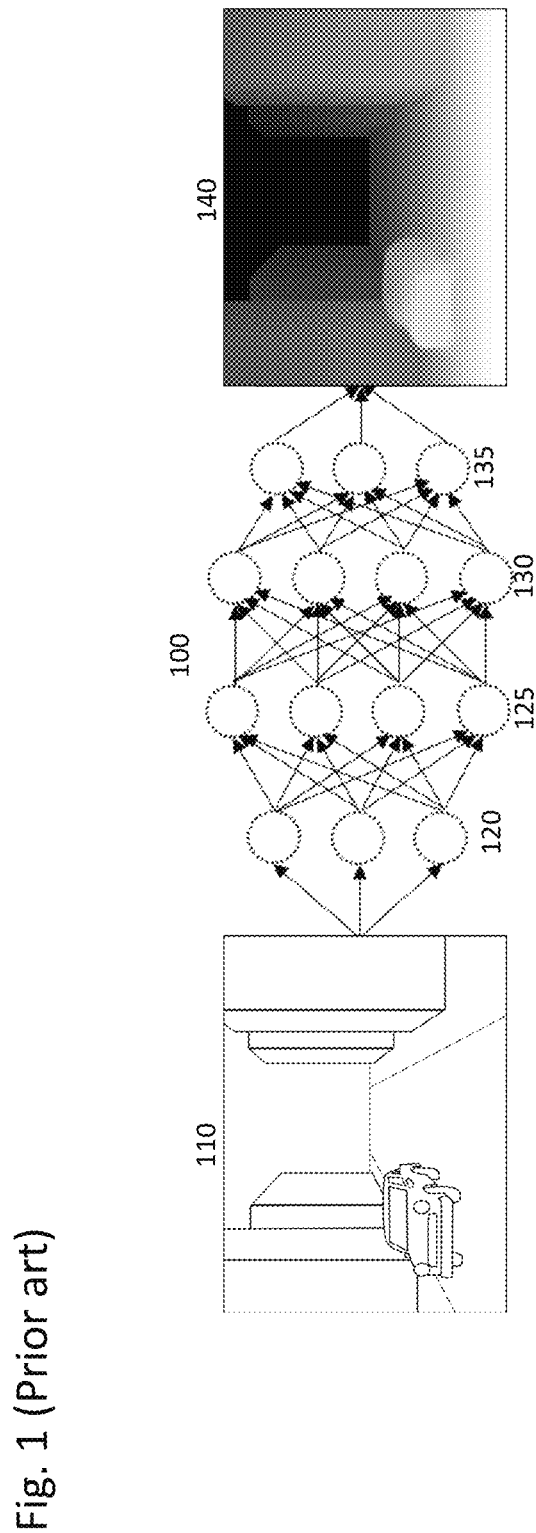
FIG. 1 shows inference processing of normal images using a neural network according to the prior art.

FIG. 1 shows inference processing of normal images using an artificial intelligence neural network according to the prior art. Image processing of the normal image 110 is done with the artificial intelligence neural network 100 to output the results at 140. The neural network can be of any kind. In some embodiments, the neural network can be a convolutional neural network (CNN) trained via deep machine learning techniques or the like, but this is not always the case according to the present invention and some other neural network with or without any image convolution could also be used. In some embodiments, this network could be a generative adversarial network (GAN). The input normal image 110 is inputted in the network for inference processing via the input nodes of the input layer 120. The exact number of nodes depends on the application and the figure with three input nodes is just an example network, in no way limiting the kind of network that can be used to process an input digital image. The networks could also consist of an unknown number of hidden layers like the layers 125 and 130 in this example figure, each having any number of nodes. It could also consist of several sub-networks or sub layers, each doing separate tasks, including, but in no way limited to, convolution, pooling (Maximum pooling, average pooling or other type of pooling), striding, padding, down-sampling, up-sampling, multi-feature fusion, rectified linear unit, concatenate, fully connected layers, flatten layers or the like. The network could also consist of a final output layer 135, consisting of any number of output nodes. In this example figure, the dashed lines around the nodes represent a neural network not trained with images having controlled distortion. The output interpreted data 140 of the network is a result from the original input digital image and can be of various kind, including, but in no way limited to, image depth information, object recognition, object classification, object segmentation, estimation of optical flow, connecting edges and lines, localization and mapping (SLAM), super-resolution images creation or the like. Because the input digital image 110 does not have controlled distortion to create a zone of interest in the image, there is no part of the image with increased number of pixels and hence the results from the neural network are according to the existing prior art. Specifically for the example of FIG. 1, the application shown is the generation of a depth map from the input image. The resulting depth map has low resolution everywhere in the image, including on the car which will be the object of interest in the example of FIG. 2.

Figure 2:
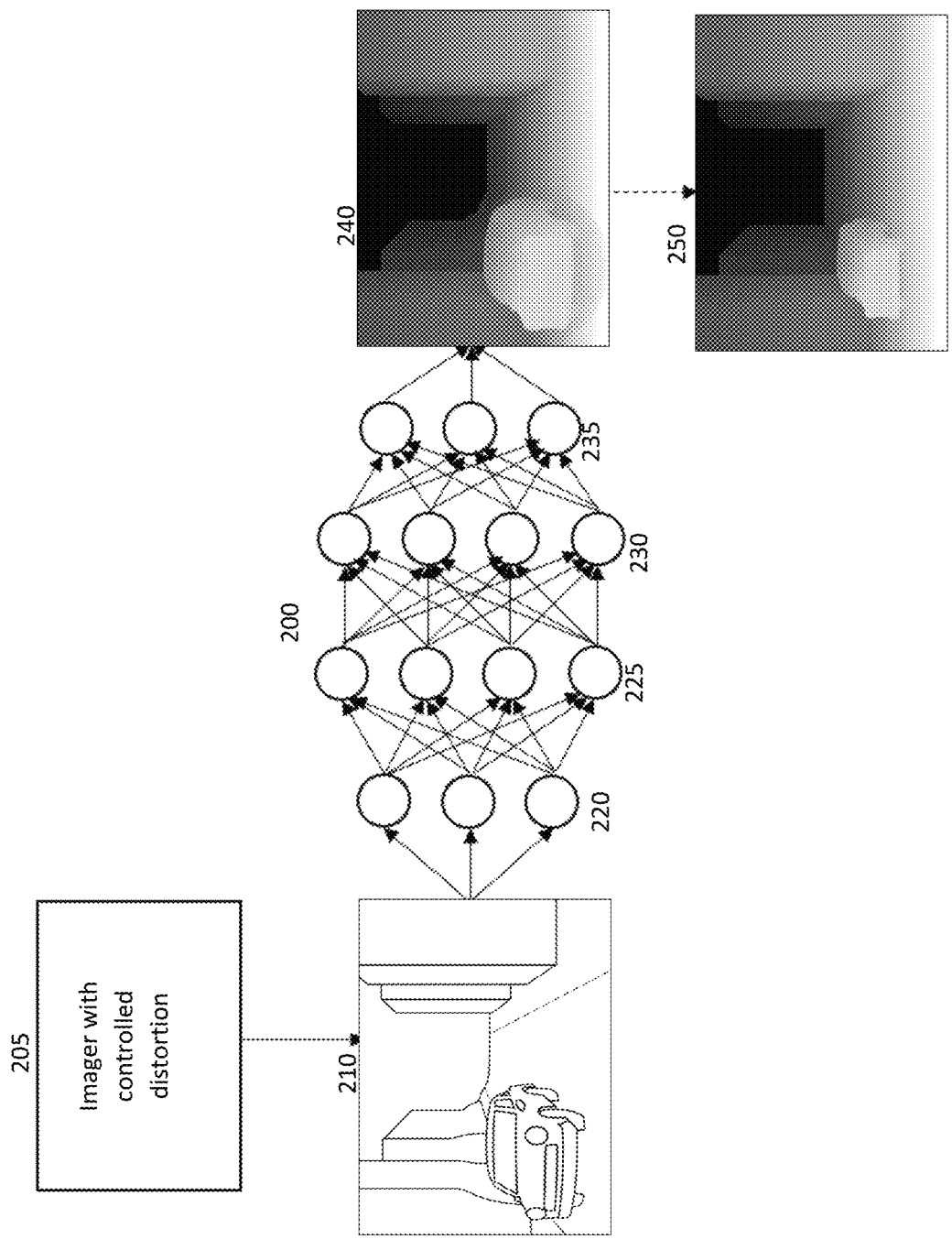
FIG. 2 shows the method for inference processing images with controlled distortion using a neural network to improve the output of the network.

FIG. 2 shows the method for inference processing of images with controlled distortion using an artificial intelligence neural network to improve the output of the neural network according to the present invention. The method starts with an imager 205 creating an image with controlled distortion. The imager 205 can be any kind of device creating a digital image file having controlled distortion to increase the number of pixels in a zone of interest, including, but in no way limiting the scope of the present invention, a virtual image generator, a software or hardware image distortion transformation algorithm or device changing on purpose the distortion of a digital image file. This device changing on-purpose the distortion of a digital image file could be of any kind, including, but in no way limited to, a computer comprising a central processing unit (CPU), some memory unit and some way to receive and send the digital image file like a personal computer (PC), a smartphone, a tablet, an embedded system or any other device capable of transforming distortion of a digital image file. This imager could also be mainly hardware algorithm, either executed on an application-specific integrated circuit (ASIC), a field-programmable gate array (FPGA) or the like. The imager could also be a device comprising at least one camera system, the camera system comprising at least one or multiple optical systems, the optical system forming an image with controlled distortion, or the like. Here, the optical system could be made of any combination of refracting optical elements, reflecting optical elements, diffractive optical elements, meta-material optical elements or any other optical element. This optical system could also be an optical system comprising an active optical element like a deformable mirror, a liquid lens, a spatial light modulator or the like in order to change and adapt in real-time the resulting distortion profile of the optical system. This optical system could create at least one zone of increased resolution using any number of aspherical or freeform optical elements in order to better control the distortion. In some embodiments according to the present invention, the optical system is preferably a wide-angle lens having a diagonal field of view larger than 60°, wherein the wide-angle lens comprises multiples optical elements divided sequentially in a front group of elements, an aperture stop, a rear group of elements, the wide-angle lens forming an image in an image plane.

The output of the imager device 205 is the image 210 having on-purpose controlled distortion. In this example of FIG. 2, only one image file is show for simplicity, but the method according to the present invention would also be compatible with multiple image files, assembled or not into a digital video file. This digital image file 210 has controlled distortion, defined as at least one zone of interest wherein the resolution (or magnification), calculated in pixels per degree of the object field of view, is at least 10% higher than compared to the normal digital image file 110. In some other embodiments according to the present invention, controlled distortion is defined has having a zone of interest that has at least 20%, 30%, 40% or 50% more pixels per degree than in the image without distortion. By creating this at least one zone of interest, the imager may keep the same total field of view than the image without this zone of interest or may change the total field of view.

The digital image file 210 with on-purpose controlled distortion is then inputted inside the artificial intelligence neural network 200. The neural network 200 can be of any kind, including machine learning neural network trained via deep learning techniques, including but in no way limited to, convolutional neural network (CNN) or the like. The neural network 200 includes algorithms, software codes, or the like running on a physical computing device to interpret input data of any kind and is trained for processing images with controlled distortion. The physical computing device can be any hardware capable of running such algorithms, including, but in no way limited to, a personal computer, a mobile phone, a tablet, a car, a robot, an embedded system or the like. This physical computing device may comprise any of the following: An electronic mainboard (or motherboard), at least one processor, part or not of a central processing unit (CPU), some memory (RAM, ROM or the like), drives (hard drive, SSD drive or the like), a graphical processing unit (GPU), a tensor processing unit (TPU), an application-specific integrated circuit (ASIC), a field-programmable gate array (FPGA) or any other component allowing the neural network to run and transform the input digital image file into an output interpreted data result.

In this embodiment of FIG. 2, the artificial intelligence neural network 200 has been specifically trained with deformed images having controlled distortion in order to better process them as will be explained with respect to FIG. 3. The input digital image file with controlled distortion 210 is received by the network 200 via the input nodes of the input layer 220. The number of nodes depend on the application and the figure with three input nodes is just an example network, in no way limiting the kind of network that can be used to process an input digital image. The networks could also consist of an unknown number of hidden layers like the layers 225 and 230 in this example figure, each having any number of nodes. It could also consist of several sub-networks or sub layers, each doing separate tasks, including, but in no way limited to, convolution, pooling (Maximum pooling, average pooling or other type of pooling), striding, padding, down-sampling, up-sampling, multi-feature fusion, rectified linear unit, concatenate, fully connected layers, flatten layers or the like. The network could also consist of an output layer 235, consisting of any number of output nodes. In this example figure, the full lines around the nodes represent a neural network trained with images having controlled distortion for outputting improved results and the arrows in the neural network are from left to right, or from the input to the output layers of the neural network, representing inference processing of the network. The network then proceeds with inference processing of the input digital image file in order to output interpreted data. The output interpreted data 240 of the network is derived from the input digital image file 210 with controlled distortion and can be of various kind, including, but in no way limited to, image depth information, object recognition, object classification, object segmentation, estimation of optical flow, connecting edges and lines, simultaneous localization and mapping (SLAM), super-resolution images creation or the like.

Because the input digital image file 210 has controlled distortion to create a zone of interest in the image, there is at least one part of the image with an increased number of pixels and hence the outputted interpreted data results from the artificial intelligence neural network are improved compared to the results from an input digital image file without controlled distortion, as in the prior art output 140. For example, this improvement could be a more accurate depth map, having more pixels of resolution, when the application of the artificial intelligence algorithm is to estimate a depth map from a single image as schematized in this figure, it could be a better object classification or recognition because of the higher number of pixels for the object of interest or any other improved result from the neural network compared to the network from the prior art using normal image without controlled distortion. The improvement on at least a single image can be measured in various ways depending on whether the output from the neural network is qualitative or quantitative, including, but not limited to, a decrease of relative (calculated in %) or absolute (calculated in units proper to the application of the network) difference between the output and the ground-truth, a root mean squared RMS error, a mean relative error, a mean log10 error, a threshold accuracy, or the like. The improvement can also be calculated on a score based on true positives, false negatives, true negatives and false positives in the output as a precision P score, a recall R score, an F score or the like. The improvement can also be measured as an increase of a probability output or a confidence level output from the neural network, especially when the output is qualitative as for example in a classification neural network. In some embodiments, the improvement between the original image with controlled distortion and the original image without controlled distortion is also measured in an increased percentage of accuracy from using a large dataset of input digital image files with controlled distortion and comparing the result with a similar large dataset of input digital image files without controlled distortion.

In the example of FIG. 2, the output from the neural network is a digital image file, but this is not always the case and the output could also be a text output, a light signal, a haptic feedback or any other output generated from inputting the image with controlled distortion inside the neural network. In the case when the output is a digital image file 240, the image can also optionally be further processed via image dewarping to remove at least in part the controlled distortion to get the digital image file with less or no controlled distortion 250 if the output digital image is to be displayed to a human observer. This optional additional dewarping step is performed with either a software algorithm running on a computer made of a processor or the like or directly on a hardware device configured to process the output digital image file 240 to remove, correct modify or process the distortion.

This optional step might not be required if the output image is to be used by a software or hardware algorithm or any other computer using the image without human intervention. In some embodiments of the present invention, the full neural network 200 consists of several sub networks configured to analyze the global image and local sub-parts of the image and combine the results. For the global image, the sub-networks could consist of several down-sampling layers followed by up-sampling layers to get back the original image resolution, these layers either using convolution or not. For the local sub-parts of the image, the sub-network could process for example, in no way limiting the scope of the present invention, several cropped parts of the original image directly or take as input the intermediate layers from the down-sampling or the up-sampling sub-networks applied to the global image. The results from the global image sub-networks and the local image sub-networks could then be combined to produce the final output of the full network, either with averaging layers, concatenating and convoluting layers or the like.

Figure 3:
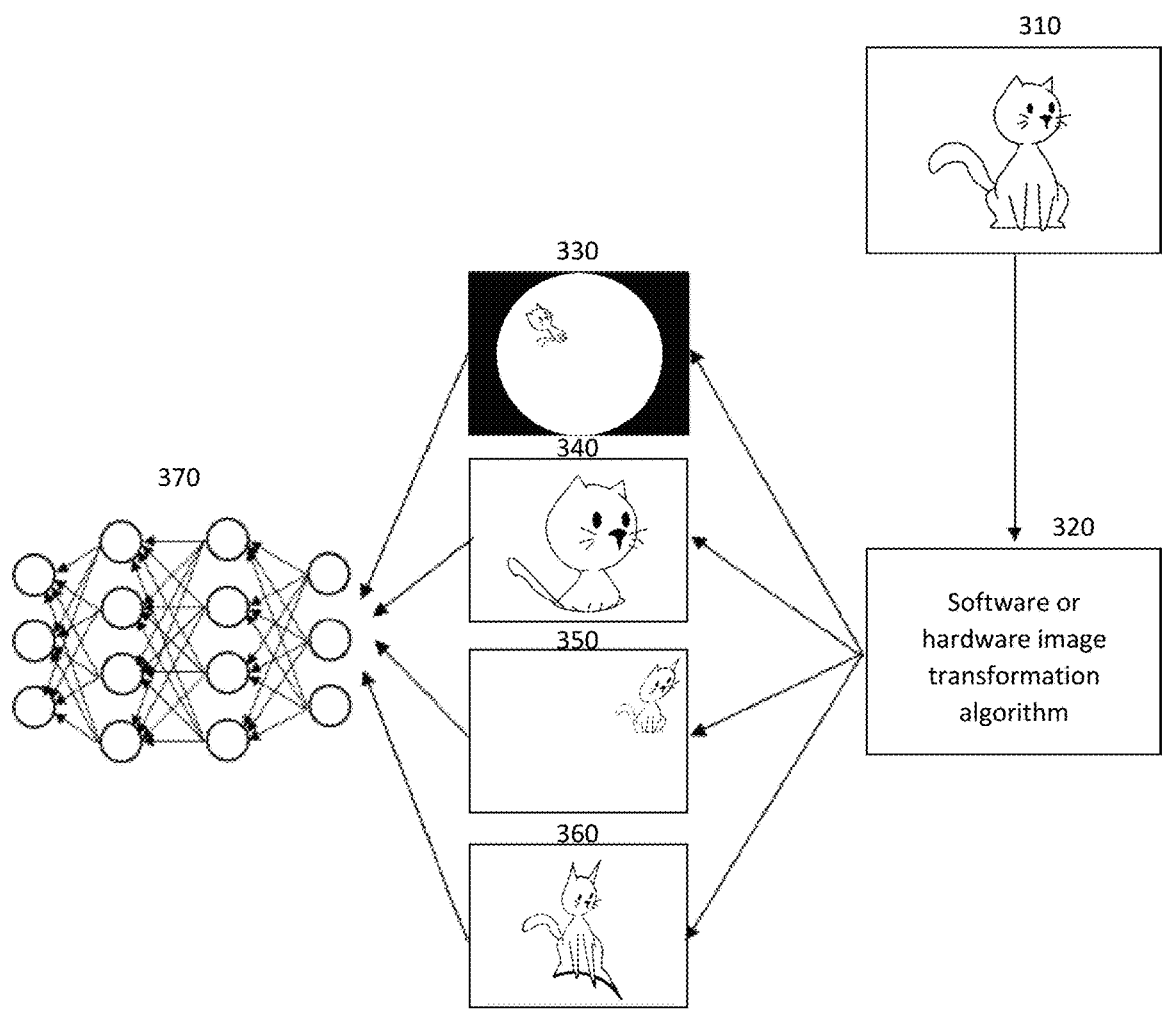
FIG. 3 shows how the artificial intelligence neural network is trained via deep learning to improve its performances with respect to images with controlled distortion.

FIG. 3 shows a method to train an artificial intelligence neural network via deep learning to improve its performances to images with controlled distortion. In this example of FIG. 3, only image files are shown for simplicity, but the method according to the present invention would also be compatible with a digital video file. The method to train the neural network via supervised learning, semi-supervised learning or unsupervised learning starts with a large database of images 310 without controlled distortion added on purpose in them. These databases of images are also often called datasets. In this example of FIG. 3, the original image without controlled distortion 310 is that of a cat with normal proportions. In order to be able to use these large existing datasets to train a neural network with supervised, semi-supervised or unsupervised learning, the method according to the present invention processes the original images from the datasets into a software or hardware image transformation algorithm 320 that transforms the original image to be with a target controlled distortion profile in a similar way than the digital file 210 that was outputted from the imager 205 in FIG. 2. The software or hardware image transformation algorithm 320 is executed on an image transformation device and will be further explained in FIG. 4. In some embodiments according to the present invention, in addition to processing the image themselves, their corresponding required resulting image, often known as ground truth image, can also be processed in the same way to add on-purpose controlled distortion. The controlled distortion target can be of any kind, including, but in no way limited to, radial barrel distortion with rotational symmetry as is often present in wide-angle images as in the example 330, freeform distortion with or without rotational symmetry and centered or not on a specific object as in the example 340, stretched distortion or pincushion distortion that is visible only in the corner of the image or in any other part of the image as in the example 350, stretched distortion or pincushion distortion in the whole image as in the example 360, or any other kind of distortion creating at least a zone of interest having at least 10% more pixels per degree than in a perfect image. Here, the perfect image can be either an image with uniform pixel density and proportions, following a rectilinear projection or any other ideal image for a given neural network. In some other embodiments according to the present invention, controlled distortion is defined has having a zone of interest that has at least 20%, 30%, 40% or 50% more pixels per degree than in the image without distortion.

Any of the new images with controlled distortion generated may have either the same field of view or a different field of view than the original image without controlled distortion. When the field of view of the new image generated is larger than the field of view of the original image, the remaining part of the image can be filled with anything, including a computer generated background image, a background extracted from another image, multiples copies of the original image, multiples images from the original dataset, image extrapolation, void or any other type of image completion to fill as required the missing part of the field of view.

The new datasets generated with images with controlled distortion like 330, 340, 350 and/or 360 are then used to train the neural network 370 to learn to use these images with controlled distortion. In this example of FIG. 3, the arrows in the schematized neural network are from right to left, or from the output to the input layers of the neural network, representing training of the network via back-propagation instead of inference processing from the input to the output that is represented with arrows from left to right in other figures. This learning can be supervised learning in which the input image and the output ground truth result desired from the neural network form a known pair. It can also be used in unsupervised learning in which the input image is associated to an unknown ground truth output result from the network. The new datasets can also be used in any other type of learning or reinforcement of the deep learning neural network, including a hybrid mode between supervised and unsupervised known as semi-supervised or any other way to train an artificial intelligence using datasets of images. When training the networks, any optimization technique can be used to optimize on the weights between each nodes of each layers, including, but in no way limiting the scope of the present invention, gradient descent, back propagation, genetic algorithms, simulated annealing, randomization optimization algorithms or the like. The loss function (also known as cost function or energy function) used during the optimization of the neural network can be of any kind according to the present invention depending on the required application of the neural network. In some embodiments of the present invention, when training a neural network to analyze or process wide-angle images generally having total field of view larger than ≈60°, because existing wide-angle datasets are much rarer and often dos not exist with the ground truth result for a desired application, wide-angle images generated from virtual 3D environments can be used to train the neural network. In some case, when a small wide-angle dataset exists but it needs to be larger for accurate training, a combination of existing real wide-angle images and virtually generated wide-angle images are used.

Figure 4:
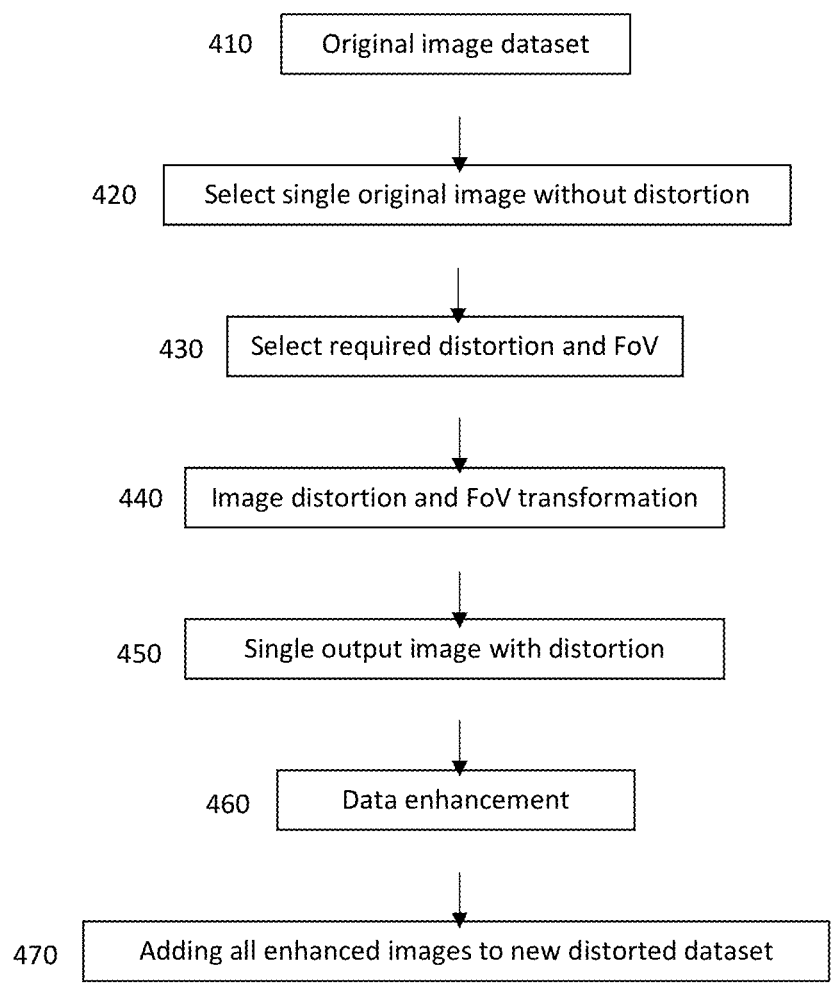
FIG. 4 shows how the software or hardware image transformation algorithm is used to create a distorted dataset from an original dataset.

FIG. 4 shows how the software or hardware image transformation algorithm running on an image transformation device is used to create a distorted dataset from an original dataset. The method starts with an original image dataset 410. There exist several of these datasets openly available on the Internet, including images from real natural objects, from artificial or virtual objects or hybrid datasets mixing real and virtual objects. The objects in these datasets of images or video can be of various kinds to help train various kinds of artificial intelligence neural network, including text, human faces, animals, buildings, street views, or the like. These existing datasets are captured from normal lenses without on-purpose distortion or generated with normal views without controlled distortion. The method then selects one of the images from the dataset to adapt it at step 420. The example method illustrated at FIG. 4 only transforms one image from the original dataset, but in a real case of generating a new dataset, the same method can be applied successively to as many original images as desired. Also, the method according to the present invention would also be compatible for creating datasets from multiple image files, assembled or not into a digital video file. In some embodiments according to the present invention, in addition to processing the original image 410, their corresponding required resulting image, often known as ground truth image, is also processed in the same way to add on-purpose controlled distortion to both the original image and the ground truth image.

The next step of the method is to select the required on-purpose controlled distortion target and field of view of the image at step 430. The controlled distortion target added on-purpose depends on the specific application required from the neural network to be trained with the new dataset and can be of any kind, including, but in no way limited to, radial barrel distortion with rotational symmetry as is often present in wide-angle images, freeform distortion with or without rotational symmetry and centered or not on a specific object, stretched distortion or pincushion distortion that is visible only in the corner of the image or in any other part of the image, stretched distortion or pincushion distortion in the whole image, or any other kind of distortion creating at least a zone of interest having at least 10% more pixels per degree than in the original image from the original dataset 410, the original image generally having either uniform pixel density or following a rectilinear projection. In some other embodiments according to the present invention, controlled distortion is defined as having a zone of interest that has at least 20%, 30%, 40% or 50% more pixels per degree than in the original image without distortion from the original dataset 410. For the field of view, its selection also depends on the specific application required from the neural network to be trained with the new dataset and can be different any value from ultra-narrow-angle field of view to ultra-wide-angle field of view. The field of view of the transformed image can be different or not than the field of view of the original image.

Once the required controlled distortion target and field of view is selected, the next step is the image transformation step 440. The transformation comprises an image transformation device which is configured to execute either software or hardware transformation algorithms. This device can do some image processing, including, but not limited to, distortion transformation. This processing is done either at the hardware or the software level by any device capable of executing image distortion transformation algorithm or any image processing algorithm. This image transformation device changing the distortion of a digital image file could be of any kind, including, but in no way limited to, a computer comprising a central processing unit (CPU), some memory unit and some way to receive and send the digital image file. This can be a personal computer (PC), a smartphone, a tablet, an embedded system or any other device capable of transforming distortion of a digital image file. This device transforming the distortion could also consist mainly of a hardware algorithm, either executed on an application-specific integrated circuit (ASIC), a field-programmable gate array (FPGA) or the like.

At step 440, the image transformation device receives the original digital image file without controlled distortion and receives the selection of a controlled distortion target before transforming the original input digital image file to an output transformed digital image file with the controlled distortion target. The output of step 440 is step 450 where a single digital image with the desired distortion and field of view is stored either in memory or on a storage drive. The associated ground truth information or classification for this new digital image is either already known from the information already available in the original dataset or determined via any other way, including any generic nearness algorithm from near sets theory or topological similarities to compare the original image and the new image. The single image with distortion 450 can then optionally be used to create multiple similar transformed digital images at step 460 by using data enhancement techniques operations like rotation, translation, scaling, homothety, mirroring or any other image transformation operation to increase the number of situations, orientation, size or position in the full image that the neural network is trained with. The dataset can also be expanded by using projection techniques as planispheric, rectilinear, perspective tilt correction, or any kind of projections. All the resulting images from the data enhancement step 460 are then added to the new dataset with images having on-purpose distortion 470 as the last step of the method to create this new image dataset to train the neural network. This new transformed digital image file is then used to train a neural network for inference processing digital image files having controlled distortion.

Figure 5:
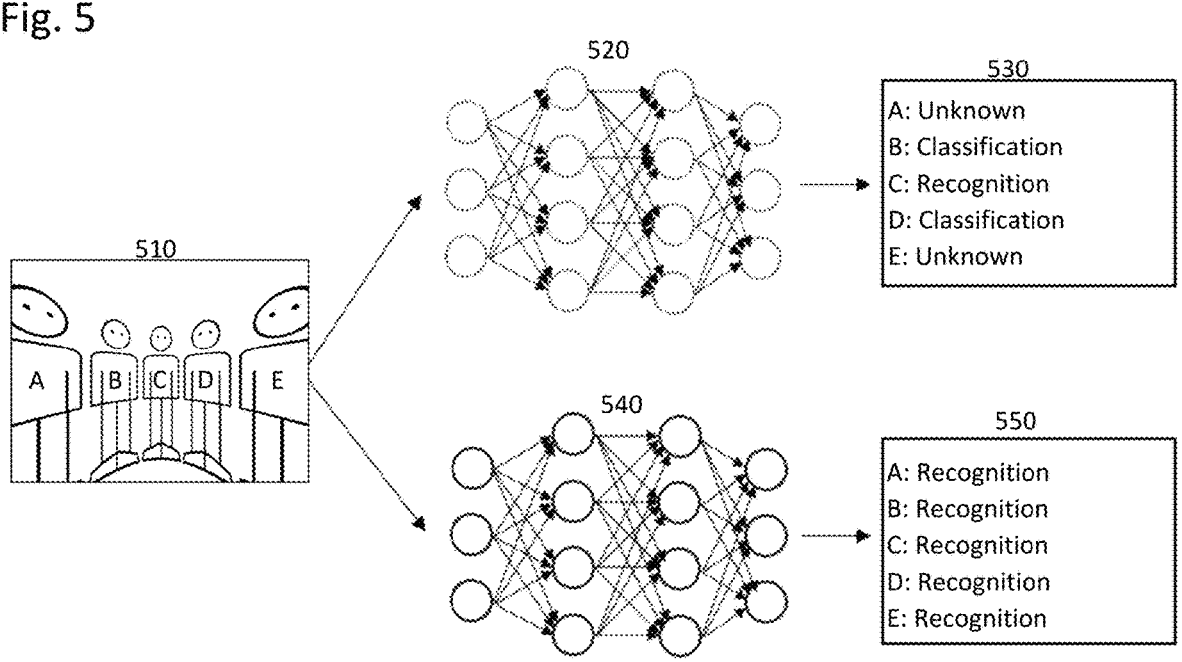
FIG. 5 compares the performances of an inference neural network trained without images having controlled distortion with a neural network trained with images having controlled distortion to process images with distortion.

FIG. 5 compares the performances of a neural network trained without images with controlled distortion with a neural network trained with images having controlled distortion to process images with distortion. In this example of FIG. 5, only one image file is shown for simplicity, but the method according to the present invention would also be compatible with multiple image files, assembled or not into a digital video file. The original image with distortion 510 is an example group picture with 5 people that comes from an imager device as described in FIG. 2 and has an increase of pixels per degree toward the corners of the images. This kind of image is common in wide-angle imagers with diagonal field of view over 60° in which the corners stretch the image proportions in order to keep straight lines in the object as straight as possible in the images with an increase of pixels per degree from the center toward the corners. This stretching of the images makes it harder for automated analysis with a classical image processing or an artificial intelligence-based image processing algorithm to output optimal results because the faces are not in the proportions the algorithms are used to. For this reason, when the image with distortion 510 is inputted in the neural network untrained with distorted images 520, the output 530 is poor. In this example of FIG. 5, the output of the network is classification and recognition of people, but this is just an example output according to the present invention and any image processing or image analysis output from a neural network could be used in accordance with the current invention. In the result window 530, the persons A and E are so stretched that the algorithm was not even able to classify the shape as a human person. For persons B and D, they are not as stretched. The algorithm 520 was able to classify them as humans but was not able to recognize them. Only the person C in the center was recognized by the algorithm because in the center of the image, the number of pixels per degree is mainly constant and the human face proportions are kept. When the same image with distortion 510 is inputted in the neural network trained with distorted image 540 as described in FIG. 3, the output results 550 are improved. This time, because the network is used to recognize people with distorted proportions, it was able to recognize all five of them properly. This example of FIG. 5 was with a classification and recognition application, but convolutional neural networks trained with distorted images according to the method of the present invention offer improved performance for any application when the input digital image file has controlled distortion.

Figure 6:
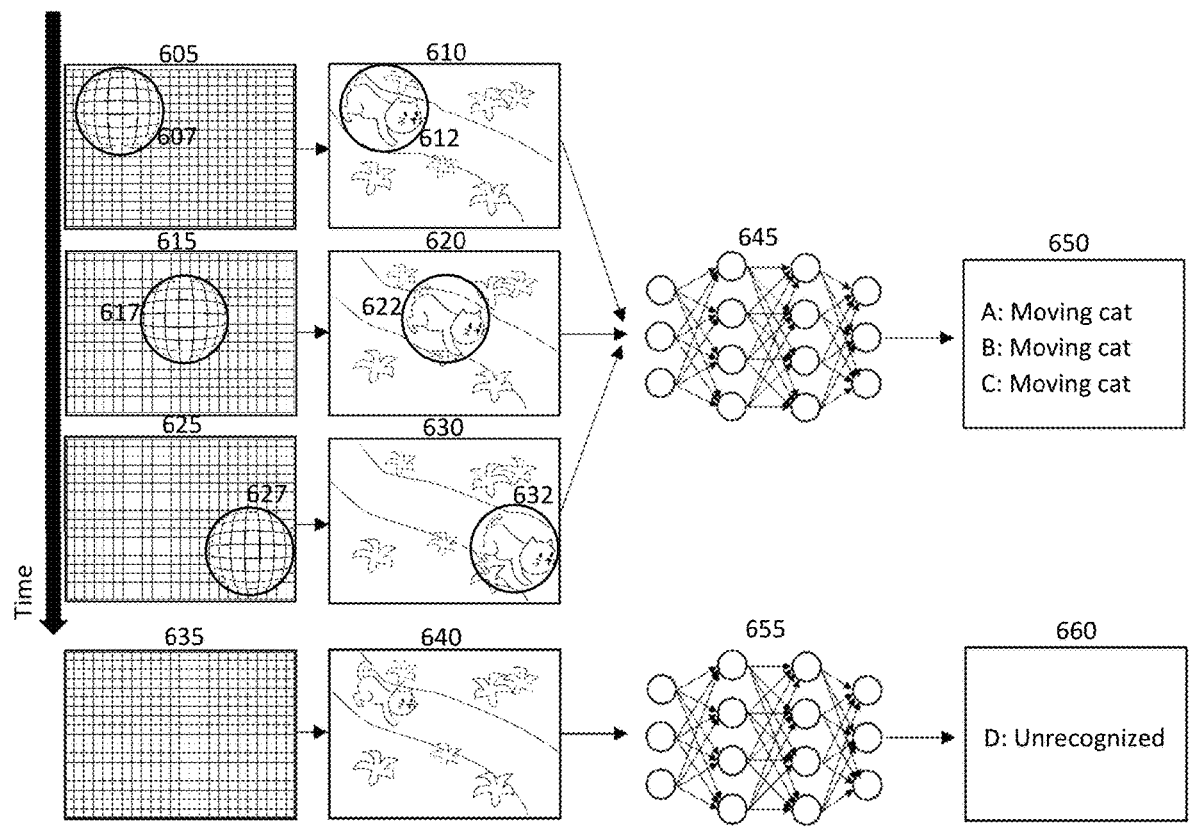
FIG. 6 shows an example in which the controlled distortion in the image outputted from the imager varies in time before inference processing inside the neural network.

FIG. 6 shows an example in which the controlled distortion in the input digital image file outputted from the imager varies in time as in frames forming a video sequence. In this example, the imager is either a camera system comprising an active optical element allowing to change the distortion in time or a hardware device able to transform image distortion directly or able to execute software image transformation algorithm, like a computer, a mobile phone, a tablet, an embedded system, an ASIC, a FPGA or the like. In the example of FIG. 6, the imager outputs the three images 610, 620 and 630 of a moving cat captured or generated at three different times representing different times from a video sequence, allowing to follow the object of interest with an area of increased resolution. The on-purpose controlled distortion added to image 610 is represented by the deformed mesh 605. The circled area 607 in the mesh and 612 in the image represents the region in which a local magnification was applied to distort the image as needed to provide more imaging pixels to the neural network. If the total field of view remains the same, the area of increased magnification is surrounded by an area of lowered magnification to compensate the area of interest and still have the same total field of view in the same total number of pixels. However, this is not always required and in some other embodiments, the area of increased magnification could be compensated by a smaller total field of view instead of being compensated by an area of lowered magnification.

At a later time, represented by the vertical axis in the figure, the same kind of local magnification is applied to image 620 and image 630, on which the deformed meshes 615 and 625 have been respectively applied. The circled regions 617 and 627 in the meshes and the circled regions 622 and 632 in the images represent this area of local magnification. In this example of FIG. 6, there is only 1 zone of local magnification per image, but this is in no way limiting the scope of the present invention which could also be used with multiples of these zones of local magnification in the image at the same time. The images with on-purpose controlled distortion are then inputted in the artificial intelligence neural network 645 that was trained via learning techniques using distorted images as explained with respect to FIG. 3. Because of the magnified view around the walking cat, the input of the neural network has more pixels of information in that region. The output of the neural network 645 is the result 650 which is improved because the network had an object with increased resolution as an input.

In this example of FIG. 6, with all three cases, the neural network was able to recognize the moving cat, but the application of the neural network 645 is not limited to recognition and could be any other application with any kind of output 650 according to the present invention. As a comparison, FIG. 6 also shows at 640 a fourth output from the imager, but this time without the real-time controlled distortion following the object of interest. The lack of on-purpose controlled distortion added to image 640 is represented by the uniform mesh 635. The image 640 is then processed in the neural network 655, which can be identical or different than the network 645 and the output is result 660. In this example, this time, since the resolution on the object of interest was not high enough, the neural network was not able to identify the cat in the image. In some embodiment of the present information, the neural network is configured to combine the input or the output of at least two image frames captured or generated at different times in order to improve the results by giving some weight to the temporal consistence between successive images frames in a video. This video processing can optionally be done with the use recurrent neural networks.

Figure 7:
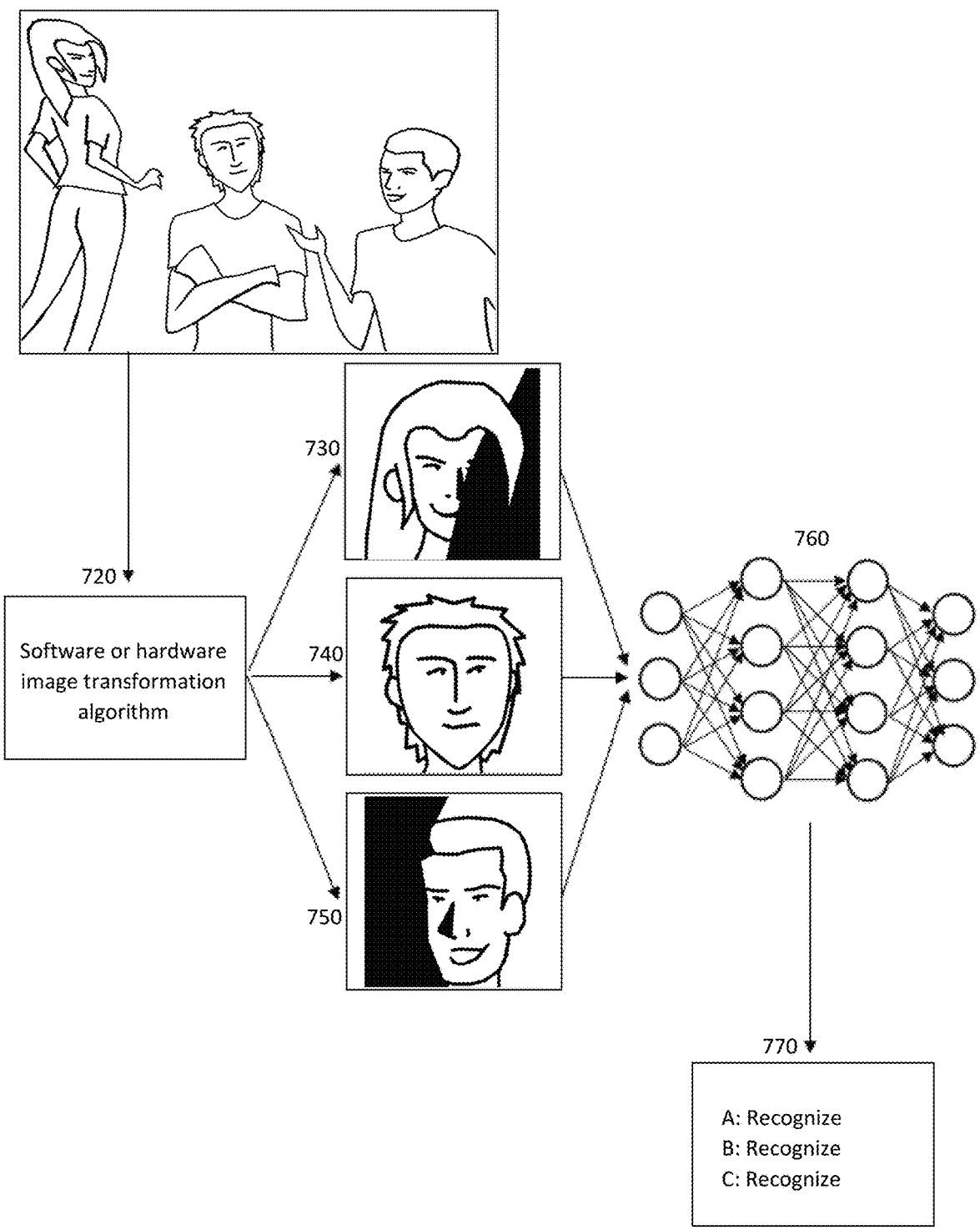
FIG. 7 shows an example wherein the distortion is transformed to a standardized distortion profile before inputting the image in the neural network for inference processing.

FIG. 7 shows an example wherein the distortion of the images is transformed to a transformed digital image file having standardized controlled distortion profile format before inputting the image with standardized controlled distortion in the neural network. In this example, the objects of interest are human faces, but the method according to the present invention is not limited to any kind of object and could be applied to any other object. This example starts with original image 710. This original image 710 could already have some controlled distortion or not. The source of this image could be any imager, including devices having an optical system or any device capable of virtual image generation or image transformation. In the example of FIG. 7, each of the detected human faces can be individually transformed to a uniform and standard image format with controlled distortion. The three faces in image 710 are converted using the software or hardware image transformation algorithm 720 into the transformed digital image files with standardized controlled distortion 730, 740 and 750. The applied transformation can be the same or different for any of the faces, depending for example on the location in the image of the face or the orientation it is looking at. The transformation algorithm 720 can be done by any hardware device configured to transform the distortion profile of an image, including a computer comprising a processor to execute software algorithm, an ASIC, a FPGA or the like.

In the example images with standard controlled distortion 730 and 750, because the human faces were not looking directly at the image capturing system, a part of the faces is not imaged by the camera and hence a black region appears when converted to this standard view. The distorted image 740 is looking straight at the human face and no black zone of missing information is present after conversion to the standard distorted view. Because the image format is a standard, the neural network 760 only had to be trained one time instead of being trained for each type of distorted image it can receive, which is the main advantage of using a standard distorted format. Using the same standard distorted format avoids the cost and time required to generate a new distorted dataset and retrain the neural network. In this example, the resulting output 770 from the neural network 760 is that all the faces are well recognized, a better performance thanks to the standard images with on-purpose distortion, but this output could be of any type depending on the application in which the neural network is used. The method of this example provides an improvement because the standard controlled distortion profile is selected to maximize the pixel coverage of the human faces in a M×N pixels input area where M is the number of rows and N is the number of columns in the input digital images. However, the view schematized at FIG. 7 is only one example of a standardized projection for the transformed digital image file and any other standardized projection could be used according to the method of the present invention, including, but in no way limited to, an image with equirectangular distortion projection, an image with a preset circular, rectangular or freeform magnification or the like.

Figure 8:
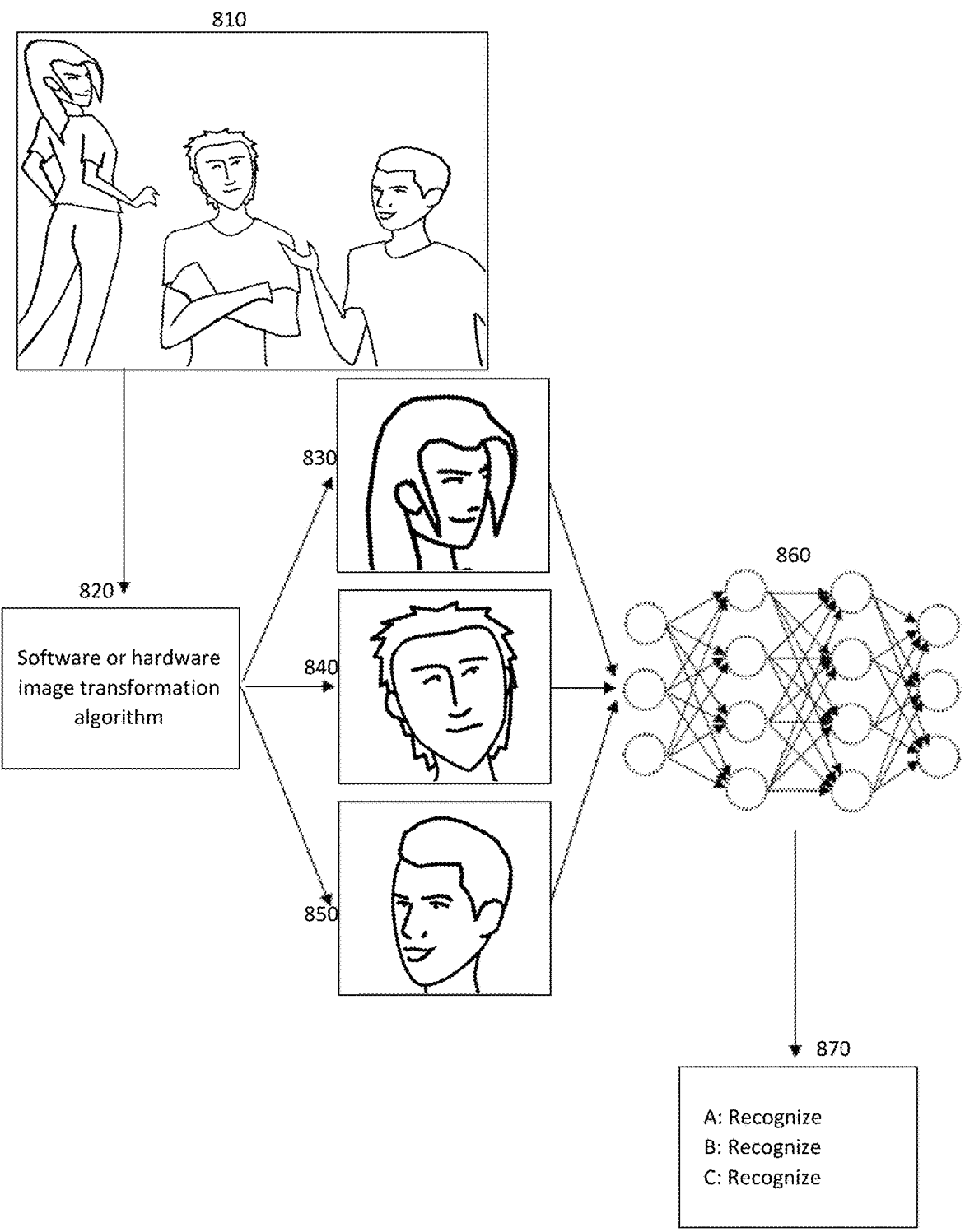
FIG. 8 shows an example wherein the distortion is dewarped before inputting the image into the neural network for inference processing.

FIG. 8 shows an example wherein the image transformation device removes at least in part the controlled distortion from the input digital image file. This is done by processing or dewarping the input digital image file into a transformed digital image file before inputting the transformed digital image file in the neural network. In this example, the objects of interest are human faces, but the method according to the present invention is not limited to any kind of object and could be applied to any other object. This example starts with original image 810 having distortion. The source of this image could be any imager devices having an optical system or any device capable of virtual image generation or image transformation. In the example embodiment of FIG. 8, all the detected human faces are processed to remove at least partially the distortion inside a software or hardware image transformation algorithm 820. The transformation algorithm 820 can be done by any hardware device configured to transform the distortion profile of an image, including a computer comprising a processor to execute software algorithm, an ASIC, a FPGA or the like. The transformation algorithm 820 dewarps the original image 810 to remove, correct, modify or process the distortion in order to get the images of the faces without distortion 830, 840 and 850. The images 830, 840 and 850 are then inputted in the normal neural network 860 that was trained with images without on-purpose controlled distortion and the output is the result 870. In this example, the resulting output 870 from the neural network 860 is that all the faces are well recognized, something possible because the distortion in the original image 810 was dewarped before inputting in the neural network. This example output is not limited to human face recognition and could be of any type depending on the application in which the neural network is used.

In some other embodiments according to the present invention, the original image before inputting in the neural network includes additional information or parameters, whether written inside the digital image file metadata, inside a visible or invisible marker or watermark in the image or transmitted to the neural network via another source. These additional information or parameters can be used to help either the image transformation algorithm or the neural network itself to improve even further the results.

All of the above are figures and examples show the method of using on-purpose controlled distortion to improve the resulting output from neural networks. In all these examples, the imager, camera or lens can have any field of view, from very narrow to extremely wide-angle. The neural network having at least an input and an output can be of any kind. These examples are not intended to be an exhaustive list or to limit the scope and spirit of the present invention. It will be appreciated by those skilled in the art that changes could be made to the examples and embodiments described above without departing from the broad inventive concept thereof. It is understood, therefore, that this invention is not limited to the particular examples or embodiments disclosed, but it is intended to cover modifications within the spirit and scope of the present invention as defined by the appended claims.

We claim:

1. A method for inference processing of at least one input digital image file with controlled distortion using an artificial intelligence neural network to improve the output of the neural network, the method comprising:
   a. receiving, by a neural network, an input digital image file with controlled distortion created by an imager;
   b. inference processing, by the neural network, the input digital image file, wherein the neural network is formed by algorithms or software codes running on a computing device and has been specifically trained for processing images with controlled distortion, wherein the inference processing is performed without removing the controlled distortion from the input digital image file;
   c. outputting, by the neural network, interpreted data derived from the input digital image file by the inference processing, the interpreted data output being an output digital image file with the controlled distortion; and
   d. dewarping the output digital image file to remove at least in part the controlled distortion.

2. The method of claim 1, wherein the imager is a device changing on-purpose the distortion of a digital image file to a controlled distortion.

3. The method of claim 1, wherein the imager comprises at least one camera system, the at least one camera system comprising of at least one optical system.

4. The method of claim 1, wherein the neural network is a machine learning neural network trained via deep learning techniques.

5. The method of claim 1, wherein the neural network was trained using digital image files having controlled distortion.

6. The method of claim 1, wherein the controlled distortion in the input digital image file from the imager varies in time.

7. The method of claim 1, wherein the input digital image file includes ground truth information or classification information.

8. The method of claim 1, wherein the input digital image file with controlled distortion has at least one zone of interest wherein a resolution of the input digital image file in the at least one zone of interest is at least 10% higher than compared to a digital image file without controlled distortion.

9. A method for inference processing of at least one input digital image file with controlled distortion using an artificial intelligence neural network to improve the output of the neural network, the method comprising:
  a. receiving, by an image transformation device, an input digital image file with controlled distortion created by an imager;
  b. transforming, by the image transformation device, the input digital image file to a transformed digital image file, wherein the transformed digital image file has a standardized controlled distortion;
  c. inference processing, by a neural network, the transformed digital image file, wherein the neural network is formed by algorithms or software codes running on a computing device and has been specifically trained for processing images with the standardized controlled distortion, wherein the inference processing is performed without removing the standardized controlled distortion from the transformed digital image file;
  d. outputting, by the neural network, interpreted data derived from the transformed digital image file by the inference processing, the interpreted data output being an output digital image file with the standardized controlled distortion; and
  e. dewarping the output digital image file to remove at least in part the standardized controlled distortion.

10. The method of claim 9, wherein the imager is a device changing on-purpose the distortion of a digital image file to a controlled distortion.

11. The method of claim 9, wherein the imager comprises at least one camera system, the at least one camera system comprising of at least one optical system.

12. The method of claim 9, wherein the neural network is a machine learning neural network trained via deep learning techniques.

13. The method of claim 9, wherein the neural network was trained using digital image files having the standardized controlled distortion.

14. The method of claim 9, wherein the controlled distortion in the input digital image file from the imager varies in time.

15. The method of claim 9, wherein the input digital image file includes ground truth information or classification information.

* * * * *